United States Patent
Masukura et al.

(10) Patent No.: US 7,432,983 B2
(45) Date of Patent: Oct. 7, 2008

(54) MOVING-PICTURE PROCESSING METHOD AND MOVING-PICTURE PROCESSING APPARATUS WITH METADATA PROCESSING

(75) Inventors: Koichi Masukura, Kawasaki (JP); Osamu Hori, Yokohama (JP); Toshimitsu Kaneko, Kawasaki (JP); Takeshi Mita, Yokohama (JP); Koji Yamamoto, Yokohama (JP); Yoshihiro Ohmori, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1041 days.

(21) Appl. No.: 10/705,957

(22) Filed: Nov. 13, 2003

(65) Prior Publication Data

US 2004/0148640 A1    Jul. 29, 2004

(30) Foreign Application Priority Data

Nov. 15, 2002   (JP)   ............... 2002-332756

(51) Int. Cl.
H04N 1/393    (2006.01)
H04N 1/387    (2006.01)
H04N 9/74    (2006.01)

(52) U.S. Cl. .............. 348/576; 348/578; 348/581; 348/722; 382/298; 382/309; 345/620; 715/723

(58) Field of Classification Search ........... 348/578, 348/576, 722, 581; 382/309, 103, 298, 299; 345/620, 628, 625; 715/723, 724, 625

See application file for complete search history.

(56) References Cited

U.S. PATENT DOCUMENTS

| 6,912,327 | B1 * | 6/2005 | Hori et al. ............ 382/305 |
| 6,961,446 | B2 * | 11/2005 | Imagawa et al. ....... 382/103 |
| 6,989,868 | B2 * | 1/2006 | Masukura et al. ....... 348/441 |
| 7,174,055 | B2 * | 2/2007 | Hori et al. ............ 382/305 |

FOREIGN PATENT DOCUMENTS

| JP | 2001-250120 | 9/2001 |
| JP | 2002-176619 | 6/2002 |

OTHER PUBLICATIONS

Yamaguchi Noboru, et al. "Transcoding Technology for MPEG Video Format", Toshiba Review, vol. 57, No. 6, 2002, pp. 18-22.

* cited by examiner

*Primary Examiner*—David Ometz
*Assistant Examiner*—Jean W Désir
(74) *Attorney, Agent, or Firm*—Oblon, Spivak, McClelland, Maier & Neustadt, P.C.

(57) ABSTRACT

A moving-picture processing apparatus includes an acquisition unit configured to acquire metadata including information about each temporal region in an input moving picture with a plurality of temporal regions, a decision unit configured to determine a cutout region corresponding to at least any one of the plurality of temporal regions on the basis of the metadata, and a cutting-out unit configured to cut out the cutout region from an image in each frame of the input moving picture.

12 Claims, 5 Drawing Sheets

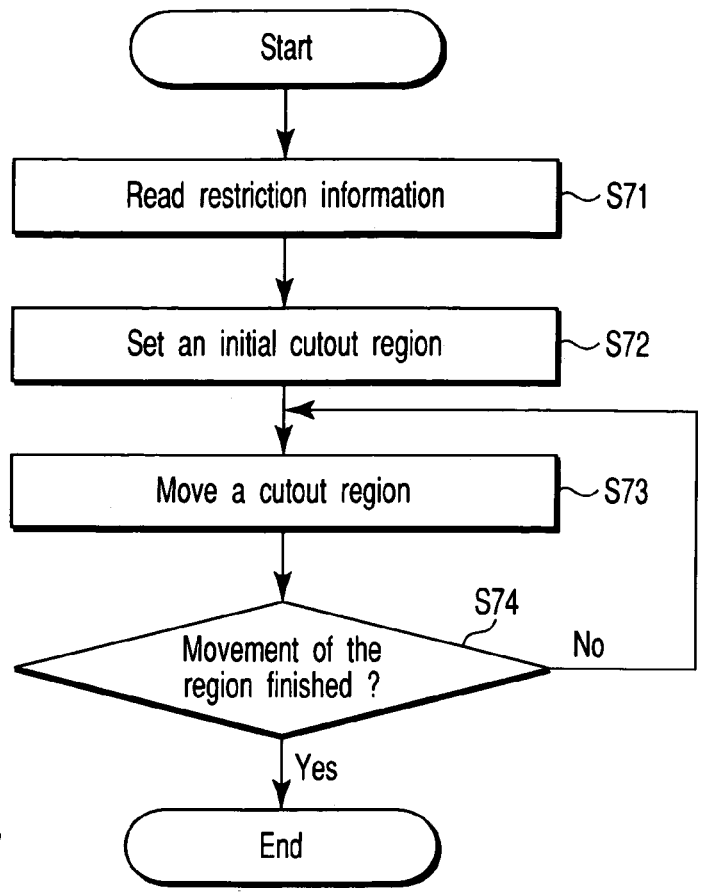
F I G. 7
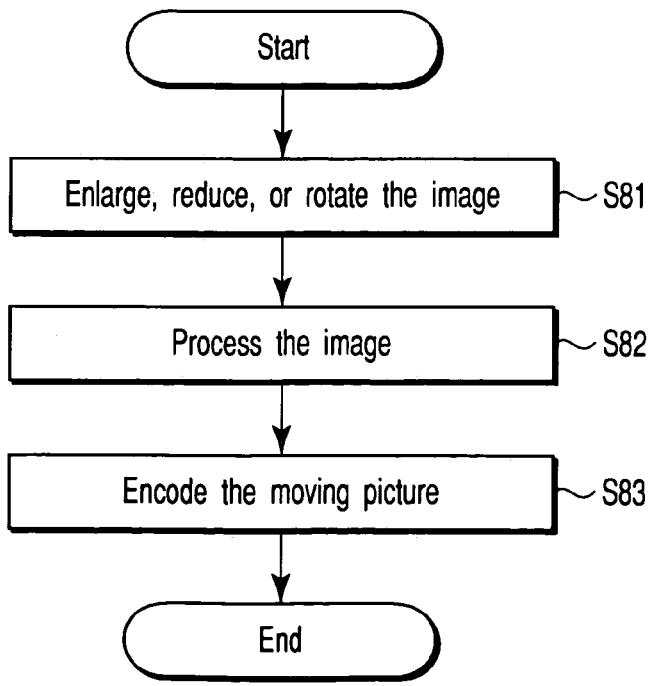
F I G. 8 understand# MOVING-PICTURE PROCESSING METHOD AND MOVING-PICTURE PROCESSING APPARATUS WITH METADATA PROCESSING

CROSS-REFERENCE TO RELATED APPLICATIONS

This application is based upon and claims the benefit of priority from the prior Japanese Patent Application No. 2002-332756, filed Nov. 15, 2002, the entire contents of which are incorporated herein by reference.

BACKGROUND OF THE INVENTION

1. Field of the Invention

This invention relates to a method of and an apparatus for processing supplied moving pictures on the basis of various pieces of information attached to the moving pictures. The processing of moving pictures includes the process of cutting out a rectangular region from the image of each frame of the input moving picture and the process of forming an output moving picture from the rectangular region. The information attached to moving images is generally called metadata. Metadata includes the feature quantity of a moving picture, meaning information about a moving picture, the way of using processed moving pictures, and information on control of the rectangular region cutting-out position.

2. Description of the Related Art

With the recent rapid progress in image processing technology, moving pictures and still pictures have been generally handled in digital data form. Digitizing images makes it possible to compress image data, such as a large amount of data in moving pictures, efficiently. In addition, portable electronic equipment (hereinafter, referred to as portable apparatuses), including mobile phones and PDAs (Personal Digital Assistants) has been popularized rapidly. Among portable apparatus users, there have been demands for moving pictures to be browsable even on a portable apparatus.

Since the connection channel capacity, resolution, and memory capacity of a portable apparatus are low, it is necessary to create moving pictures for portable apparatuses to assure comfortable browsing. To create moving pictures for portable apparatuses, such a scheme as MPEG-4 has already been proposed. MPEG-4 is an international standard for converting moving pictures into portable-apparatus-oriented moving picture encoding formats efficiently. The details of MPEG-4 have been described in, for example, Yamaguchi Noboru, Kodama Tomoya, Masukura Koichi, "Transcoding Technology for MPEG Video Format," TOSHIBA Review, Vol. 57, No. 6 (2002), pp. 18-22.

Information called metadata is attached to moving pictures. Use of metadata may realize easily the search, editing, delivery, and browsing of moving pictures. MPEG-7 has been proposed as one of the international standards related to metadata. Use of MPEG-7 makes it possible to write data, combining the physical feature quantities of moving pictures and sound, the meaning feature quantities, including contents, and copyright information. In the future, it is expected that the number of cases where moving pictures are handled together with metadata according to MPEG-7 will increase sharply.

Portable apparatuses differ in screen resolution and storage capacity from one type to another. For this reason, to prepare moving pictures for image delivery, it is necessary to create different moving pictures, depending on the type, which makes the procedure very complicated.

Furthermore, the image reproduction on portable apparatuses is characterized in that the resolution is low, the screen is small, and the aspect ratio of the screen is that of a portrait format screen. Therefore, images created for the reproduction on a television or a personal computer cannot be used as moving pictures for portable apparatuses, even if they are reduced directly. Even if images of this type are enlarged or reduced according to the resolution of the portable apparatus, the following problems arise: the aspect ratio is mismatched with that of the portable apparatus and small objects and characters cannot be distinguished.

BRIEF SUMMARY OF THE INVENTION

It is, accordingly, an object of the present invention to provide a moving-picture processing method and a moving-picture processing apparatus which are capable of processing input moving pictures suitably to produce easy-to-see output moving pictures.

According to an aspect of the present invention, there is provided a moving-picture processing apparatus includes an acquisition unit configured to acquire metadata including information about each temporal region in an input moving picture with a plurality of temporal regions; a decision unit configured to determine a cutout region corresponding to at least any one of the plurality of temporal regions on the basis of the metadata; and a cutting-out unit configured to cut out the cutout region from an image in each frame of the input moving picture.

This invention relates to the technique for cutting out an arbitrary region from the image of each frame constituting the input moving picture and processing the cut-out region. The moving picture composed of the images obtained as a result of the processing are set as an output moving picture. Specifically, in the invention, the cutout region is determined on the basis of information on the temporal regions included in the metadata attached to the input moving picture in such a manner that at least a part of at least one of the temporal regions is included in the output moving picture.

A temporal region, which is a region extracted on the basis of at least part of the image features of the input moving picture, corresponds to a single region having a temporal and spatial expanse. The moving picture includes original image data, or previously encoded data. A cutout region from the image of each frame constituting the input moving picture includes a rectangular region.

A cutout region may be determined on a plurality of pieces of information on the temporal regions in such a manner that a certain temporal region is selectively included in the output moving picture and another temporal region is not included in the output moving picture.

Furthermore, a cutout region is determined on the basis of various types of information in the metadata. These types of information include image feature quantities including the color, movement, texture, cut, and special effects of the input moving picture, the position of an object, and character information in the input moving picture. They further include sound feature quantities including loudness, frequency spectrum, waveform, contents of speech, and tone. They also include meaning feature quantities including place, time, person, feeling, event, degree of importance, and link information. In addition, they further include use information including the user of the output moving picture, the apparatus in use, the channel in use, the purpose of use, and billing information.

Furthermore, a cutout region may be determined on the basis of any of the positions of cutout regions over a plurality of frames previously calculated, previously created restriction information about cutting-out positions, and cutting-out position control information, such as a camera work parameter string.

BRIEF DESCRIPTION OF THE SEVERAL VIEWS OF THE DRAWING

FIG. 7 is a flowchart showing an example of the sequence of the calculation of the cutout region; and FIG. 8 is a flowchart showing an example of the process of cutting out a moving picture.

DETAILED DESCRIPTION OF THE INVENTION

Hereinafter, referring to the accompanying drawings, an embodiment of the present invention will be explained in detail.

Figure 1:
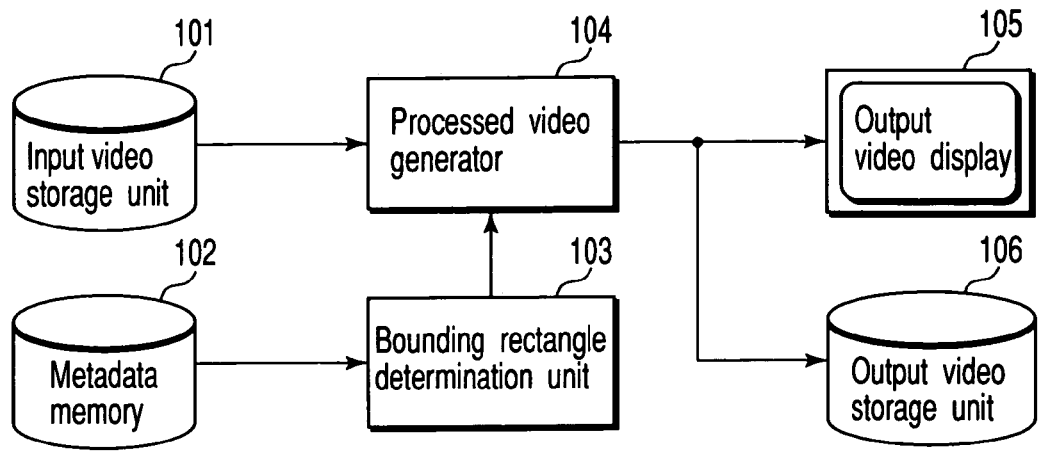
FIG. 1 is a block diagram showing the configuration of a moving-picture processing apparatus according to an embodiment of the present invention.

FIG. 1 is a block diagram showing the configuration of a moving-picture processing apparatus according to an embodiment of the present invention. The moving-picture processing apparatus comprises an input moving-picture storage unit 101, a metadata storage unit 102, a cutout region decision unit 103, a moving picture cutting-out unit 104, an output moving-picture display unit 105, and an output moving-picture storage unit 106. The apparatus can be realized by, for example, a general-purpose computer and software running on the computer. Part of the elements shown in FIG. 1 can be realized in the form of computer program modules running under the control of an operating system.

The input moving-picture storage unit 101, which includes, for example, a hard disk drive, an optical disk, or a semiconductor memory, stores input moving pictures or moving picture encoding data. The input moving-picture storage unit 101 may be any unit, as long as it can store the input moving pictures or moving picture encoding data and then output the pictures or data. For instance, a video camera or a broadcast wave tuner may be used as the input moving-picture storage unit 101.

The metadata storage unit 102, which includes, for example, a hard disk drive, an optical disk, or a semiconductor memory, stores metadata attached to input moving pictures. How metadata is related and attached to the input moving pictures is determined arbitrarily. For instance, metadata may be divided into a plurality of items or exist on a plurality of physical devices. In addition, metadata may be integrated into the input moving pictures stored in the input moving-picture storage unit 101. Metadata can be obtained by analyzing the input moving pictures. Metadata can also be obtained by analyzing the image output apparatus and its output channel. The user may supply metadata directly to the moving-picture processing apparatus in processing images.

The input moving-picture storage unit 101 and metadata storage unit 102 may exist on a single physical device or separate physical devices. Alternatively, they may exist in a remote place by way of a network or broadcast waves.

The cutout region decision unit 103 reads metadata from the metadata storage unit 102 and determines an image cutout region (e.g., a rectangular region) for each frame constituting the input moving picture, on the basis of the read-out metadata. Basically, a cutout region is determined each time each frame arrives. The present invention is not limited to this. For instance, cutout regions in a plurality of frames may be determined at a time. Alternatively, a once-determined cutout region may be modified according to the cutout region or metadata in another frame.

The moving-picture cutting-out unit 104 cuts out an image region corresponding to the cutout region determined by the cutout region decision unit 103 from each frame of the input moving picture stored in the input moving-picture storage unit 101. As a result, the moving picture cutting-out unit 104 produces an output moving picture. Both of the frame including the region to be cut out and the cut-out region may be subjected to an image process, such as enlargement/reduction, rotation, or filtering. The output moving picture is encoded on the basis of, for example, MPEG-1, MPEG-2, and MPEG-4, thereby producing moving-picture encoded data. MPEG-1, MPEG-2, and MPEG-4 belong to the international standards for moving picture processing.

The output moving-picture display unit 105 displays the output moving picture produced at the moving-picture cutting-out section 104. The output moving-picture display unit 105 may be any unit, such as a CRT or liquid crystal, as long as it has a screen capable of displaying moving pictures. In addition, the output moving-picture display section 105 may exist in a remote place by way of a network or broadcast waves. For instance, the output moving-picture display unit 105 may be a personal computer, a mobile phone, or a portable information terminal. When receiving moving-picture encoded data, the output moving-picture display unit 105 decodes the moving-picture encoded data and displays the resulting data.

The output moving-picture storage unit 106, which includes, for example, a hard disk drive, an optical disk, or a semiconductor memory, stores the output moving picture produced at the moving-picture cutting-out section 104. Like the output moving-picture display unit 105, the output moving-picture storage unit 106 may exist in a remote place by way of a network or broadcast waves.

At least either the output moving-picture display unit 105 or the output moving-picture storage unit 106 is needed according to the use of the moving-picture processing apparatus. Of course, the moving-picture processing apparatus may be provided with both of them.

Figure 2:
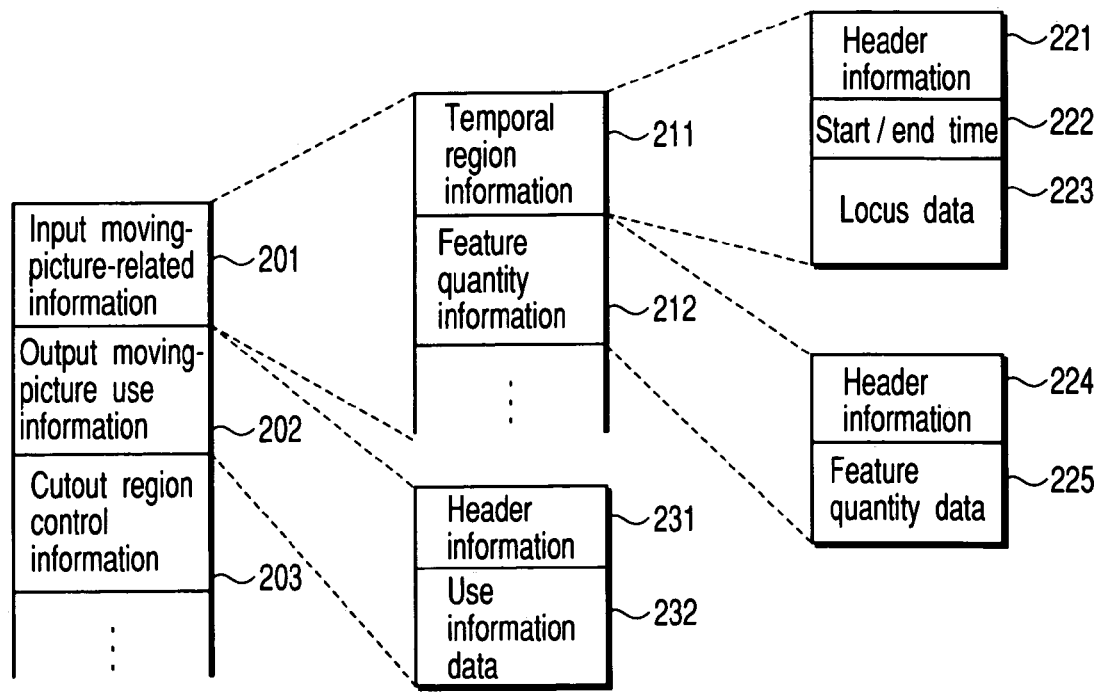
FIG. 2 shows an example of a data structure of metadata.

FIG. 2 shows an example of a data structure of metadata. Metadata related to the embodiment includes input moving-picture-related information 201, output moving-picture use information 202, and cutout region control information 203. At least one of the input moving-picture-related information 201, output moving-picture use information 202, and cutout region control information 203 is indispensable. There may be a plurality of information items in each of the input moving-picture-related information 201, output moving-picture use information 202, and cutout region control information 203.

The arrangement structure of the input moving-picture-related information 201, output moving-picture use information 202, and cutout region control information 203 is determined arbitrarily. The arrangement structure of information means, for example, the order in which each piece of information is arranged. For example, the arrangement structure may be a tree structure where the output moving-picture use information 202 includes the cutout region control information 203. That is, the data structure of metadata is not limited to the structure of FIG. 2. Any data structure may be used, as long as it can store specific information explained in detail below and read the information as needed. For instance, a structure complying with MPEG-7 may be used as this type of data structure.

The input moving-picture-related information 201 includes temporal region information 211 about the input moving picture or input moving-picture encoded data, and feature quantity information 212. At least one of the temporal region information 211 and the feature quantity information 212 is indispensable. In addition, a plurality of information items may exist for each of the temporal region information 211 and the feature quantity information 212.

The arrangement structure of the temporal region information 211 and the feature quantity information 212 is determined arbitrarily. For instance, the arrangement structure may be a tree structure where the feature quantity information 212 is written in the temporal region information 211. In this case, the tree structure represents a temporal region written in the temporal region information 211 as having a feature quantity written in the feature quantity information 212.

Of the regions forming the input moving picture, the temporal region information 211 indicates a single region having a temporal and spatial expanse. The temporal region information 211 includes header information 211, start/end time (data) 222, and locus data 223. At least one of the start/end time 222 and the locus data 223 is indispensable. There may be a plurality of data items for each of the header information 211, start/end time (data) 222, and locus data 223. The header information 221 indicates the identification number and name of the temporal region information 211. The header information 221 also represents the data format for each of the start/end time (data) 222 and locus data 223.

The start/end time (data) 222 indicates the start time and end time of the temporal region information 211. The format of the start/end time (data) 222 may be any one, provided that it can determine the time uniquely. For instance, the time stamp or frame number of the input moving picture or the date that the input moving picture was taken can be used as the start/end time (data) 222.

The locus data 223 is a parameter for representing the shape of a temporal region. Any data may be used as the locus data, provided that it can represent the shape of a temporal region from the begin time to the end time. For instance, the locus data 223 can be written using MPEG-7 Spatial Temporal Locator. The locator represents the shape of a region in each frame using a rectangle, an ellipse, a polygon, and others. When the shape of the region is rectangular or polygonal, the locator corresponds to a parameter obtained by approximating the locus of each apex in the form of a function. When the shape of the region is elliptic, the locator corresponds to a parameter obtained by approximating the locus of each apex of a circumscribed rectangle of the ellipse in the form of a function.

The feature quantity information 212 includes header information 224 and feature quantity data 225. The header information 224 indicates what type of feature quantity the feature quantity information 212 is and in what data format the feature quantity data 225 is stored. In the embodiment, the feature quantity is assumed to be image feature quantity, sound feature quantity, and meaning feature quantity. However, any feature quantity may be used, as long as it is related to the input moving picture.

The image feature quantity includes at least one of a plurality of physical feature quantities related to the input moving picture and a plurality of feature quantities estimated from known physical quantities. The physical feature quantity includes feature quantities including the color, movement, texture, cut, and special effect of the input moving picture, the position of an object, and character information on the input moving picture. These feature quantities are defined for at least one or more frames of images in the input moving pictures or for a part of the image train.

The sound feature quantity includes at least one of the physical feature quantities including the loudness, frequency spectrum, waveform, contents of speech, and tone and the feature quantities estimated from those physical feature quantities. The sound feature quantity is defined for a part or all of at least one audio channel of the input moving pictures.

The meaning feature quantity includes at least one of the pieces of information describing the contents of the moving picture, including place, time, person, feeling, event, degree of importance, and link information. The meaning feature quantity is defined for a part or all of the input moving picture.

The feature quantity data 225, which is actual data representing the contents of the feature quantity written in the feature quantity information 212, is stored according to the data format corresponding to the type of the feature quantity specified in the header information 224. For example, the feature quantity data 225 can be represented by a color histogram, if it is data on color. In addition, the feature quantity data 225 can be expressed by a place name or latitude and longitude, if it is data on a place. The representation form (data format) of the feature quantity data 225 is determined arbitrarily, as long as it can determine the feature quantity.

The output moving-picture use information 202, which indicates information about the use of output moving pictures, includes header information 231 and use information data 232. The use information data 232 may have such a tree structure as allows the output moving-picture use information 202 to be included in it.

The header information 231 indicates what type of information the output moving-picture information 202 is and in what data format its concrete use information data 232 is stored. The output moving-picture information 202 may be any information, as long as it is information about the use of output moving pictures, such as the user or the apparatus in use.

The user means a person who uses output moving pictures. The output moving-picture information 202 includes a name or ID that identifies the user, information indicating what group the user belongs to, the purpose of use, and billing information.

The apparatus in use means an apparatus used in browsing the output moving pictures. The output moving-picture information 202 includes an apparatus name, an OS (operating system), a CPU speed, a screen resolution, the moving-picture encoding format supported by the apparatus in use, a channel format, and a channel speed.

The use information data 232, which is actual data about the output moving-picture information 202, is stored according to the type of the use information specified in the header information 231 or the data format. The data storage method differs according to the type of the output moving-picture information 202. For instance, if the output moving-picture information 202 is an apparatus name, the method may be determined arbitrarily, as long as it can determine the output moving-picture information 202, such as a character string or an ID number.

The cutout region control information 203 includes information to limit the position of a cutout region and information to determine a parameter string for camera work. The parameter string for camera work includes parameters for determining the maximum possible magnifying power to prevent the deterioration of the picture quality due to the over-enlargement of an image or imposing restrictions on camera work to prevent the cutout region from moving fast. Moreover, camera work parameters that enable the output moving picture to be reproduced in such camera work as panning or zooming and the sequence of camera work may be written.

Figure 3:
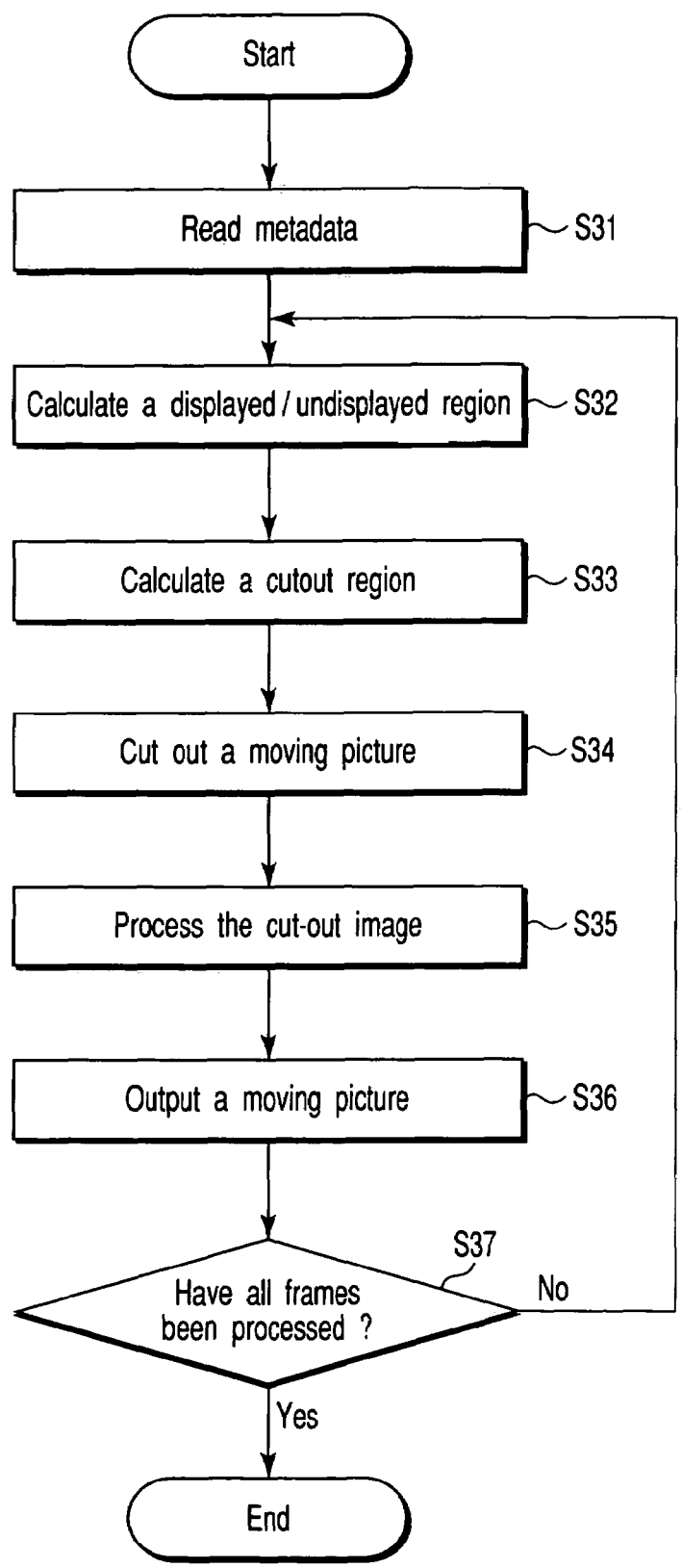
FIG. 3 is a flowchart showing an example of the processing sequence carried out by the moving-picture processing apparatus of FIG. 1.

FIG. 3 is a flowchart showing an example of the processing sequence carried out by the moving-picture processing apparatus of FIG. 1. The processing sequence of FIG. 3 includes a metadata reading step S31, a displayed/undisplayed region computing step S32, a cutout region computing step S33, a moving-picture cutting-out step S34, a cut-out moving-picture processing step S35, a moving-picture outputting step S36, and an all frame end decision step S37. Although the processing in each step is basically carried out frame by frame, it may be carried out for all of the frames or in units of two or more frames.

First, the moving-picture processing apparatus reads metadata from the metadata storage unit 102 (step S31). All of the metadata may be read at a time at the start of the processing. Alternatively, the metadata may be read as needed during the processing. Next, the moving-picture processing apparatus calculates a display region and an undisplayed region in a frame related to the processing from the temporal region information in the metadata (step S32).

Figure 4:
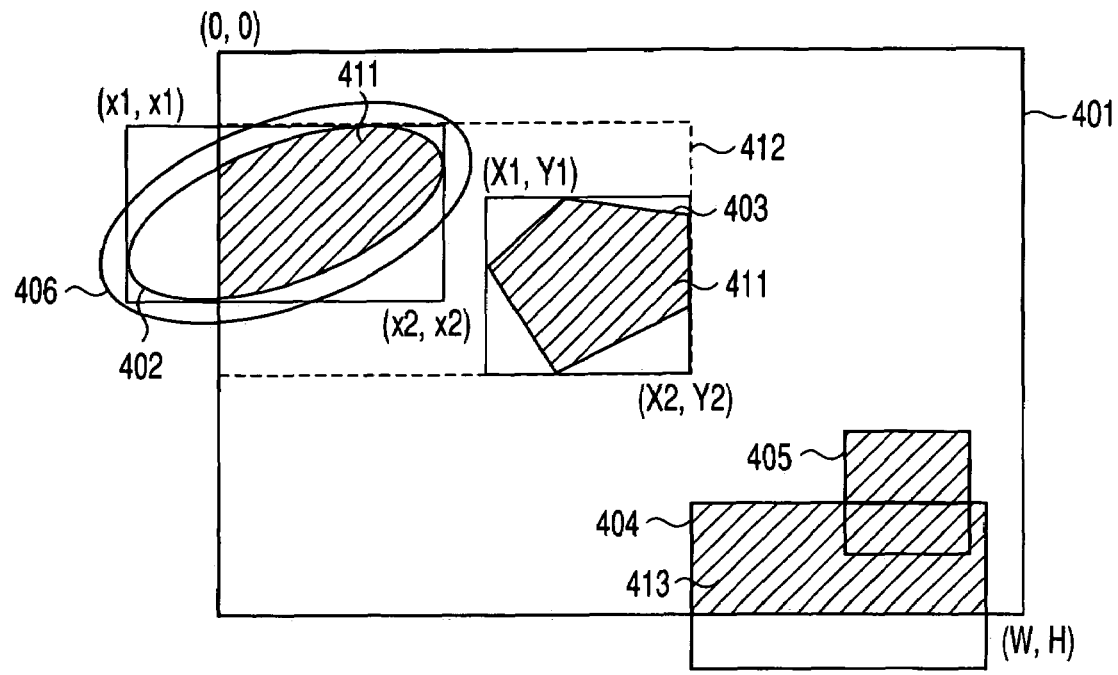
FIG. 4 is a diagram to help explain the displayed/undisplayed region calculation.
Figure 5:
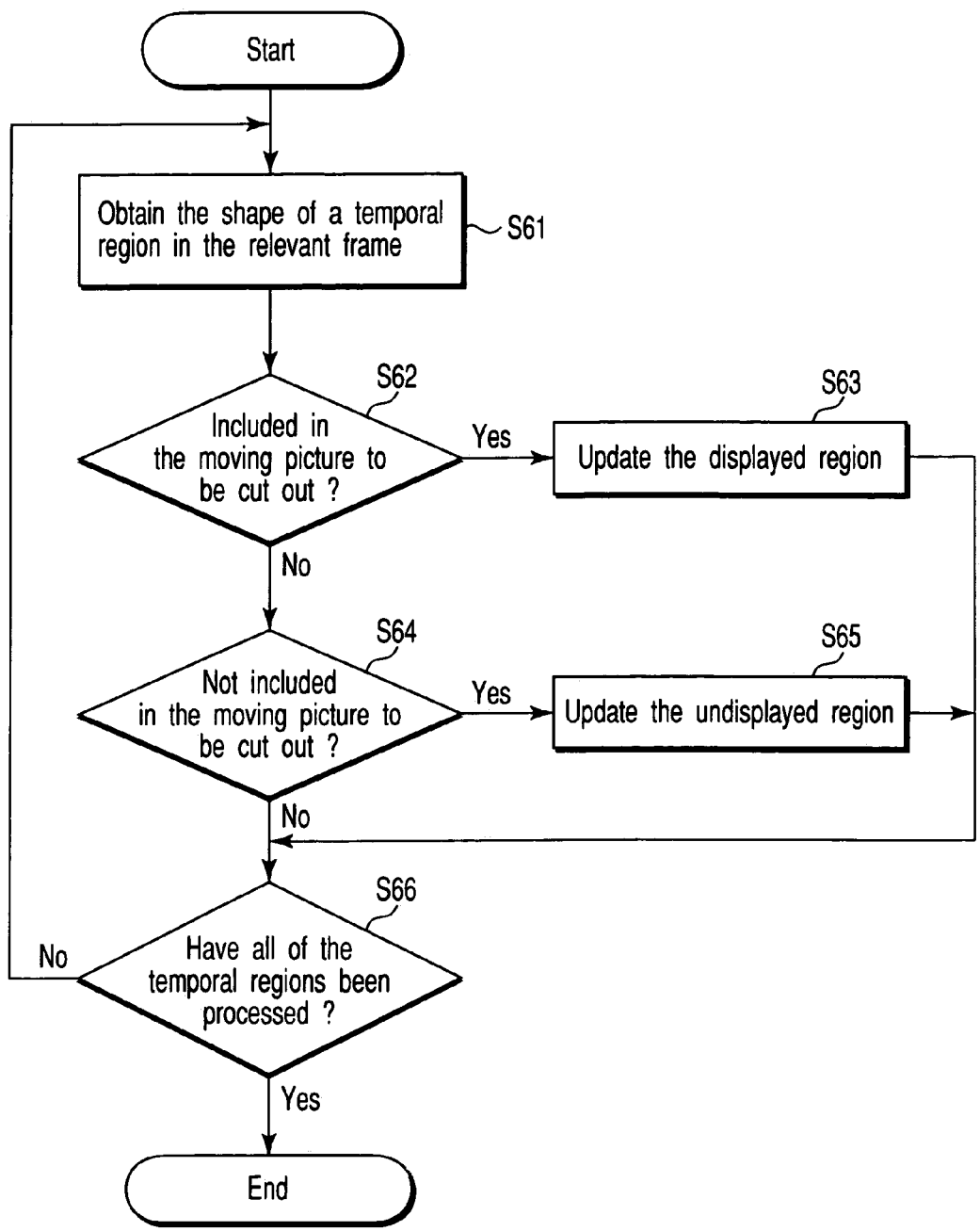
FIG. 5 is a flowchart showing an example of the sequence of the calculation of a displayed/undisplayed region.

Referring to FIGS. 4 and 5, the details of the displayed/undisplayed region calculation in step S32 will be explained. The process in step S32 makes it possible to create an output moving picture in such a manner that it includes sufficiently the important region the viewer want to see and does not include the unnecessary region.

FIG. 4 is a diagram to help explain the displayed/undisplayed region calculation. In FIG. 4, it is assumed that there are a plurality of temporal regions 402, 404 in the screen 401 of a certain frame of the input moving picture. Let the temporal region 402 be a temporal region included in the moving picture to be cut out. Let the temporal region 404 be a temporal region not included in the moving picture to be cut out.

Whether to include a certain temporal region in the moving picture to be cut out can be determined on the basis of the information in the metadata. Specifically, it can be determined on the basis of the identification number or name written in the header information 221 in the temporal region. To do this, for example, a symbol for the determination may be added beforehand to the head of the identification number or name. Alternatively, when the name coincides with a certain character string, the temporal region may be included in the moving picture to be cut out.

Preferably, whether to cut out the moving picture may be determined on the basis of the shape of or the locus data about the relevant temporal region. For instance, an elliptic region may not be included in the moving picture to be cut out. Alternatively, a temporal region passing through a specified point may be included in the moving picture to be cut out.

Furthermore, preferably, whether to cut out the moving picture may be determined on the basis of metadata related to the relevant temporal region or metadata about the parent node of the metadata in the tree structure. Furthermore, it may be determined on the basis of metadata linked with the metadata. In this way, information in another metadata related to the relevant temporal region information can be used.

For instance, when the image feature quantity related to the color or character written in the temporal region information 211 is written in the metadata, a red temporal region may be included in the moving picture to be cut out or a temporal region corresponding to a telop may not be included in the moving picture to be cut out. If the determining method is changed according to the output moving-picture use information 202, the processing of the temporal region can be changed according to the user or the apparatus in use. FIG. 5 shows the sequence of the calculation of a one-frame displayed/undisplayed region FIG. 5 is a flowchart showing an example of the sequence of the calculation of a displayed/undisplayed region. The sequence of FIG. 5 is basically carried out by processing the temporal regions in a frame one by one. Alternatively, two or more of the temporal regions may be processed at a time. It is assumed that there is no displayed/undisplayed region at the start of the processing. If the region required not to be displayed is known, the displayed/undisplayed region may be set beforehand at the start of the processing.

In FIG. 5, step S61 is a step of obtaining the shape of a temporal region to be processed in the relevant frame. Since the shape of a temporal region is expressed in a rectangle, an ellipse, or a polygon, a parameter that represents the shape is calculated. For instance, if the shape is expressed in a rectangle or a polygon, an apex coordinate string is calculated. If the shape is expressed in an ellipse, such parameters as the apex coordinates of a circumscribed rectangle, the lengths of the major and minor axes, and the rotation angle are calculated. The parameters may be arbitrary ones, as long as they can represent the shape of a frame (or a region) uniquely.

Next, it is determined whether the relevant temporal region is included in the moving picture to be cut out (step S62). If the region is included in the moving picture to be cut out, the displayed region is updated (step S63). The updated displayed region is the part included in the screen 401 of the region formed by the OR of the preceding displayed region and the region obtained in step S61. For example, suppose the preceding displayed region is a region 403 (see FIG. 4) and the region obtained in step S61 is a region 402. In this case, the updated displayed region is the part (the hatching part indicated by reference numeral 4 in FIG. 4) included in the screen 401 of the region made up of the regions 403 and 402 combined together. Since the shape of a region is expressed in parameters, the displayed region can be expressed in a shape parameter string.

The shape of a displayed region can be processed. A new displayed region can be obtained by processing a once-calculated displayed/undisplayed region. For instance, after a margin 406 is added to the periphery of the temporal region 402, a displayed region can be calculated. In addition, the smallest rectangle (bounding box) 412 including the displayed region 411 may be set as a displayed region. To add a margin, for example, the coordinates of the center of gravity of the temporal region are calculated and the coordinates of the apexes are calculated so that the distance between each apex of the shape of the region and the circumscribed rectangle and the coordinates of the center of gravity may become larger.

It is assumed that the bounding box for a conventional displayed region is expressed by (X1, Y1)–(X2, Y2), the bounding box for the shape obtained in step S61 is expressed by (x1, y1)–(x2, y2), and the screen 401 is expressed by (0, 0)–(W, H). The bounding box 412 for the updated displayed region can be expressed by (max(0, min(X1, x1), max(Q, min(Y1, y1)))–(min(W, max(X2, x2), min(H, max(Y2, y2))). In this way, the displayed region can be found out by doing simple calculations. The expression can be used in setting the bounding box as a displayed region.

In step S62, if the relevant temporal region is not to be included in the moving picture to be cut out, the displayed region is updated (step S65). The updated undisplayed region is the part included in the screen 401 of the region formed by the OR of the preceding undisplayed region and the region obtained in step S61. For example, suppose the preceding undisplayed region is a region 405 and the region obtained in step S61 is a region 404. In this case, the updated undisplayed region is the part (the hatching part indicated by reference numeral 413 in FIG. 4) included in the screen 401 of the region made up of the regions 405 and 404 combined together. Since the shape of a region is expressed in parameters, the undisplayed region can be expressed in a shape parameter string.

As in the process in step S63, the shape of a undisplayed region can be processed. A new undisplayed region can be obtained by processing a once-calculated displayed/undisplayed region. For instance, after a margin 406 is added to the periphery of the temporal region 402, an undisplayed region can be calculated. In addition, the smallest rectangle (bounding box) including the undisplayed region may be set as an undisplayed region.

In the next step, it is determined whether all of the temporal regions existing in the relevant frame have been processed (step S66). Specifically, step S61 to step S66 in the processing sequence are repeated until all of the temporal regions have been processed.

To return to FIG. 3, in step S33, a region from which the input moving picture is to be cut out in the relevant frame is calculated on the basis of the metadata and the displayed/undisplayed region calculated in step S32. The details of the cutout region calculation in step S33 will be explained by reference to FIGS. 6 and 7.

Figure 6:
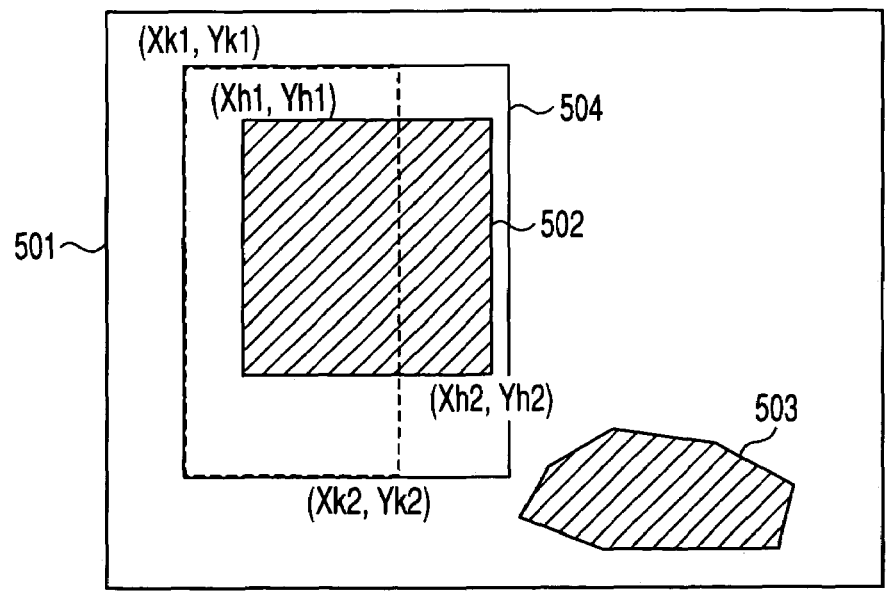
FIG. 6 is a diagram to help explain the process of cutting out a cutout region.

FIG. 6 is a diagram to help explain the process of cutting out a cutout region. As shown in FIG. 6, suppose a displayed region 502 and an undisplayed region 503 exist in the screen 501 of the frame of the input moving picture. As long as a cutout region 504 is included in the screen 501, which includes the displayed region 502, and is a rectangular region that has no part overlapping with the undisplayed region 503, the cutout region 504 has an arbitrary shape. For example, the cutout region is determined so as to be the smallest rectangular region by making the center of gravity of the cutout region equal to the center of gravity of the displayed region to cause all of the regions in the displayed region to be included in the cutout region.

FIG. 7 is a flowchart showing an example of the sequence of the calculation of the cutout region. In the sequence of FIG. 7, restriction information about the relative frame is acquired (step S71) from the metadata. The restriction information is information to limit the position of a cutout region. The restriction information includes the number of pixels and the aspect ratio of an apparatus that uses the output moving pictures, the moving speed of the cutout region in the X direction and its maximum value, the moving speed of the cutout region in the Y direction and its maximum value, the minimum width, height, and area of the cutout region, and the positional relationship between a plurality of displayed regions in the cutout region. The restriction information may not be used. Conversely, more than one piece of restriction information may be used.

When the necessary restriction information has been written in the metadata, the restriction information is read from the metadata. Moreover, metadata other than this or the cutout region in the frame is known, restriction information may be created on the basis of information about the region. For example, the position of a new cutout region is estimated from the known cutout region in the frame. Then, restriction information is created in such a manner that the new cutout region is not more than a specific distance apart from the estimated position. By doing this, it is possible to prevent the cutout region from moving rapidly in the opposite direction. In addition, when restriction information is created so as to prevent the moving speed or acceleration of the cutout region from exceeding a certain value, this enables the position of the cutout region from vibrate.

Suppose the input image region is a rectangle enclosed by the coordinates (0, 0)–(W, H), the center of the temporal region is at the coordinates (x, y), and the cutout region is a rectangle enclosed by the coordinates (X1, Y1)–(X2, Y2). In this case, when the position of the cutout region is controlled so as to meet the equations x/W=(x−X1)/(X2−X1), y/H=(y−Y1)/(Y2−Y1), this makes it possible to make the relative position of the center of the temporal region with respect to the input image region equal to the relative position of the center of the temporal region with respect to the cutout region. In addition, restriction information to make a cutout region a little larger can be created where the temporal region moves fast.

When image feature quantities, including color, movement, texture, cut, special effect, object position, and character information, written in the metadata are used, for example, the following control can be performed. Referring to the motion vector or optical flow of the screen itself or the object written in the screen, it is possible to create restriction information to set a cutout region a little larger or leave a larger margin in the direction in which the object moves. When the cut information has been written in the metadata, it is possible to create restriction information to prevent the cutout region between cuts from changing rapidly.

When sound feature quantities, including loudness, frequency spectrum, waveform, contents of speech, and tone, are used, for example, the following control can be performed. When the contents of speech are written in the metadata, it is possible to create restriction information to set a cutout region centering on the speaker in a dialog scene. When loudness is written in the metadata, it is possible to create restriction information to make the amount of change with time smaller as the sound is lower to produce a silent scene.

When meaning feature quantities, including place, time, person, feeling, event, degree of importance, and link information, are used, for example, the following control can be performed. In a baseball batting scene, it is possible to create restriction information to adjust a cutout region event by event in such a manner that the cutout region is adjusted so as to enlarge the batter. In addition, it is possible to create restriction information to make the amount of change with time of a cutout region smaller for a calm scene, referring to information on the feeling of a person.

When use information, including the user, the apparatus in use, the channel in use, the purpose of use, and billing information, is used, for example, the following control can be performed. From information on the resolution of the screen of the apparatus used in browsing, restriction information can be produced which prevents the size of one pixel after cutting out from getting smaller than the size of one pixel of an input moving picture. By doing this, the deterioration of the picture quality can be prevented. In addition, it is possible to create restriction information to change the object in the center of a cutout region user by user.

When cutout region control information, such as restriction information on a cutout position or the sequence of camera work, written in the metadata is used, for example, the following control can be performed. It is possible to create restriction information to set a cutout region in such a manner that the camera work in the output moving picture becomes equal to the parameter string of the camera work written in the cutout region control information. In addition, when the maximum values of the vertical and horizontal movements of the cutout region with time have been written in the metadata, it is possible to create restriction information to set a cutout region so as not to exceed the maximum values of movement. Furthermore, it is possible to create restriction information to make the area of a cutout region as large as possible or as small as possible.

In FIG. 7, the initial value of a cutout region is calculated in step S72. The initial value of a cutout region may be determined in an arbitrary manner. For instance, the cutout region calculated in the preceding frame may be set as the initial value. Alternatively, the bounding box of the displayed region may be set as the initial value.

In the next step, the position of the cutout region is moved so as to coincide with the displayed/undisplayed region or meet the restriction information read in step S71 (step S73). As long as the degree of coincidence is increased, a method of calculating the degree of coincidence, a method of moving the cutout region, and the movement of the cutout region are determined arbitrarily. For instance, when the cutout region does not include the displayed region, the degree of coincidence is estimated as higher, as the area of the displayed region outside the cutout region becomes smaller. Then, the cutout region is enlarged or moved so that the degree of coincidence may increase.

Suppose a cutout region 505 is expressed by (Xk1, Yk1)–(Xk2, Yk2) and a displayed region 502 is expressed by (Xh1, Yh1)–(Xh2, Yh2), where Xh1<Xk2<Xh2, Yk1<Yh1, Yh2<Yk2). The area of the displayed region outside the cutout region is calculated using (Xh2–Xk2) X (Yk2–Yk1). Therefore, moving Xk2 toward Xh2 causes the area of the displayed region outside the cutout region to decrease, which increases the degree of coincidence.

When the restriction information differs from the aspect ratio of the cutout region, the degree of coincidence is estimated as higher, as the ratio of the aspect ratio of the cutout region to the aspect ratio in the restriction information becomes closer to one. The width and height of the cutout region are increased or decreased so as to increase the degree of coincidence. Specifically, if the aspect ratio of the cutout region is $\alpha k$ (=width/height) and the aspect ratio in the restriction information is $\alpha s$, as $\alpha k/\alpha s$ gets closer to one, the degree of coincidence becomes higher. Therefore, if $\alpha k/\alpha s>1$, the width of the cutout region is decreased or its height is increased. Conversely, if $\alpha k/\alpha s<1$, the height of the cutout region is decreased or its width is increased.

To determine a method of moving the cutout region and the movement of the cutout region, the determining method may be defined beforehand for each restriction information. For instance, a method of moving the cutout region and the movement of the cutout region may be determined by a learning algorithm, such as a neural network.

In the next step, it is determined whether the cutout region coincides with the displayed/undisplayed region and the restriction information (step S74). Then, the process in step S73 is repeated until the cutout region coincides with the displayed/undisplayed region and the restriction information, which moves the cutout region. If a cutout region that fully coincides with the displayed/undisplayed region and the restriction information cannot be found, the process may be stopped after it is repeated a suitable number of times.

As described above, adjusting the cutout region by reference to the metadata makes it possible to produce an output moving picture which is suitable for the contents of the input moving picture and the method of using output moving pictures and give a natural feeling to the browser.

In the flowchart of FIG. 3, the cutout region is cut out from a frame image in the input moving picture, on the basis of the cutout region calculated in step S33. Next, in step S35, the cutout image produced in the moving-picture cutting-out step S34 is processed, thereby producing an output moving picture.

FIG. 8 is a flowchart showing an example of the process of cutting out a moving picture. In the sequence of FIG. 8, step S81 and step S82 may be reversed in order. In addition, any one of step S81, step S82, and step S83 can be omitted.

In step S81, the cutout image produced in step S34 is enlarged, reduced, or rotated. Generally, the cutout images differ in resolution. Since the resolutions of the moving pictures are often required to be constant, the cutout images are enlarged or reduced so that the resolutions of the cutout images may be equal to the resolutions of the moving pictures. Depending on the apparatus used for browsing, rotating the images 90 degrees may make it easier to browse them. In that case, the cutout images are rotated 90 degrees.

In step S82, various processes, including the filtering of the cutout images and the adding of display information, are carried out. In this step, a mosaic filter or a shading-off filter can be applied to the inside or outside of a certain temporal region, the image in a temporal region can be combined with the image in another temporal region, or character information and such information as the name of a person can be displayed on the screen as a telop. Of course, in such processes, metadata can be used. Some of these processes may be combined in any order.

In step S83, the output moving pictures are compressed into encoded data in accordance with the apparatus in use and the channel in use. Although MPEG-4, one of the international standards, is generally used as an encoding format, any encoding format may be used according to the application. When the output moving pictures need not be encoded, this step can be skipped.

Then, in step S36 (see FIG. 3), the output moving pictures produced in step S35 are output according to the application. The output moving pictures are reproduced on the apparatus in use, which enables the user to browse them. The output moving pictures are stored on a disk medium or a tape medium. To transmit the output moving pictures through a network or broadcast waves, they are converted into a suitable form and then transmitted.

Next, in step S37 (see FIG. 3), it is determined whether all of the frames of the input moving picture to be processed have been processed. Step S32 to step S37 in the processing sequence are repeated until all of the frames to be processed have been processed.

As described above, with the moving-picture processing apparatus of the embodiment, the necessary regions can be cut out suitably from the images of the frames constituting the input moving picture on the basis of the metadata. Therefore, an output moving picture can be obtained by processing the input moving picture suitably. This makes it easy to prepare moving picture to be delivered to portable apparatuses, type by type according to the difference in screen resolution or storage capacity. Portable apparatuses have the disadvantages of a low resolution, a small screen, and a screen's aspect ratio with more height than width. With the embodiment, however, the problem with the aspect ratio and the problem of being incapable of distinguishing small objects and small characters can be avoided.

As described above, with the present invention, use of metadata makes it possible to cut out cutout regions suitably from the input moving picture frame by frame. Therefore, the output moving picture corresponding to the contents of the input moving picture or the application can be produced automatically. This makes it easy to produce moving pictures adjusted to a browsing portable apparatus. That is, it is possible to process the input moving picture suitably and obtain an easy-to-see output moving picture.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving-picture processing method comprising:
    acquiring metadata including temporal region information including information for use in determining whether or not to incorporate each of temporal regions into a respective one of cutout moving pictures, and cutout region restriction information that restricts a cutout region to be cut out, in an input moving picture including a plurality of temporal regions;
    calculating a displayed/undisplayed region in a picture of each of frames of the input moving picture on the basis of the temporal region information;
    setting a cutout region to be cut out, in order that the degree of coincidence of the displayed/undisplayed region and the cutout region restriction information increases in the picture of the each frame of the input moving picture; and
    cutting out the cutout region from an image of each frame of the input moving picture.

2. The moving-picture processing method according to claim 1, further comprising:
    creating the cutout region restriction information on the basis of information regarding at least any one of an image feature quantity, a sound feature quantity, or a meaning feature quantity that are included in the metadata, the meaning feature quantity including any one of place, time, person, feeling, event, degree of importance, or link information of a description of contents of the moving picture.

3. The moving-picture processing method according to claim 1, further comprising:
    creating the cutout region restriction information on the basis of output moving-picture use information that indicates at least any one of a user of the output moving picture, an apparatus in use, a channel in use, a purpose of use, or billing information, which are included in the metadata.

4. The moving-picture processing method according to claim 1, further comprising:
    creating the cutout region restriction information on the basis of information that contains at least any one of restriction information regarding cutting-out positions or a parameter string for camera work, which are included in the metadata.

5. The moving-picture processing method according to claim 1, further comprising:
    calculating, on the basis of a first cutout region set in advance for at least one frame, a second cutout region estimated in another frame; and
    creating the cutout region restriction information on the basis of any one of a moving distance, a moving speed, or an acceleration between the first cutout region and the second cutout region.

6. The moving-picture processing method according to claim 1, further comprising:
    adding a display image to an image of the cutout region or filtering the image of the cutout region, on the basis of the metadata.

7. A moving-picture processing apparatus comprising:
    means for acquiring metadata including temporal region information including information for use in determining whether or not to incorporate each of temporal regions into a respective one of cutout moving pictures, and cutout region restriction information that restricts a cutout region to be cut out, in an input moving picture including a plurality of temporal regions;
    calculating means for calculating a displayed/undisplayed region in a picture of each frame of the input moving picture on the basis of the temporal region information;
    setting means for setting a cutout region to be cut out, in order that the degree of coincidence of the displayed/undisplayed region and the cutout region restriction information increases in the picture of each of frames of the input moving picture; and
    cutting-out means for cutting out the cutout region from an image of each frame of the input moving picture.

8. The moving-picture processing apparatus according to claim 7, further comprising:
    creating means for creating the cutout region restriction information on the basis of information regarding at least any one of an image feature quantity, a sound feature quantity, or a meaning feature quantity that are included in the metadata, the meaning feature quantity including any one of place, time, person, feeling, event, degree of importance, or link information of a description of contents of the moving picture.

9. The moving-picture processing apparatus according to claim 7, further comprising:
    creating means for creating the cutout region restriction information on the basis of output moving-picture use information that indicates at least any one of a user of an output moving picture, an apparatus in use, a channel in use, a purpose of use, or billing information included in the metadata.

10. The moving-picture processing apparatus according to claim 7, further comprising:
    creating means for creating the cutout region restriction information on the basis of information that contains at least any one of restriction information regarding cutting-out positions or a parameter string for camera work, which are included in the metadata.

11. The moving-picture processing apparatus according to claim 7, further comprising:
    calculating means for calculating, on the basis of a first cutout region set in advance for at lest one frame, a second cutout region estimated in another frame, and
    creating means for creating the cutout region restriction information on the basis of any one of moving distance, moving speed, or acceleration between the first cutout region and the second cutout region.

12. The moving-picture processing apparatus according to claim 7, further comprising:
    processing means for adding a display image to an image of the cutout region or filtering the image of the cutout region on the basis of the metadata.

* * * * *